(12) United States Patent
Kurokami et al.

(10) Patent No.: US 11,118,891 B2
(45) Date of Patent: Sep. 14, 2021

(54) AUTOMATIC THREE-DIMENSIONAL MEASUREMENT-BASED INSPECTION SYSTEM FOR WORKPIECES

(71) Applicant: FANUC CORPORATION, Yamanashi (JP)

(72) Inventors: Noboru Kurokami, Yamanashi (JP); Yuuya Miyahara, Yamanashi (JP); Yasushi Okajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 128 days.

(21) Appl. No.: 16/743,129

(22) Filed: Jan. 15, 2020

(65) Prior Publication Data
US 2020/0232777 A1   Jul. 23, 2020

(30) Foreign Application Priority Data
Jan. 18, 2019   (JP) .............................. JP2019-007142

(51) Int. Cl.
G01B 5/008   (2006.01)
(52) U.S. Cl.
CPC .................... G01B 5/008 (2013.01)
(58) Field of Classification Search
CPC .................................................. G01B 5/008
(Continued)

(56) References Cited

U.S. PATENT DOCUMENTS

| 2009/0241360 A1* | 10/2009 | Tait | G01B 21/042 33/502 |
| 2016/0033251 A1* | 2/2016 | Pinkston | G01B 5/008 702/81 |

(Continued)

FOREIGN PATENT DOCUMENTS

| JP | S5897614 A | 6/1983 |
| JP | H03-104540 A | 5/1991 |

(Continued)

OTHER PUBLICATIONS

An Office Action; "Notice of Reasons for Refusal", mailed by the Japanese Patent Office dated Apr. 27, 2021, which corresponds to Japanese Patent Application No. 2019-007142 and is related to U.S. Appl. No. 16/743,129; with English language translation.

*Primary Examiner* — George B Bennett
(74) *Attorney, Agent, or Firm* — Studebaker & Brackett PC

(57) ABSTRACT

The present disclosure is intended to provide an automatic three-dimensional measurement-based inspection system for workpieces which enables three-dimensional measurement-based inspection to be performed more efficiently. An automatic three-dimensional measurement-based inspection system for workpieces includes: an automated warehouse having a measurement target repository for storing a workpiece to undergo measurement-based inspection performed by a three-dimensional measurement apparatus, and having a measurement-purpose repository for storing the workpiece conveyed from the measurement target repository by a stacker crane when the three-dimensional measurement apparatus is going to perform the measurement; and the three-dimensional measurement apparatus provided is a three-dimensional measurement region that is adjacent to the measurement-purpose repository.

6 Claims, 4 Drawing Sheets

(58) Field of Classification Search
USPC .................................................. 33/1 BB, 503
See application file for complete search history.

(56) References Cited

U.S. PATENT DOCUMENTS

| | | | |
|---|---|---|---|
| 2018/0037412 A1 | 2/2018 | Lynch et al. | |
| 2020/0173676 A1* | 6/2020 | Ootsuka | F24F 11/64 |
| 2020/0182802 A1* | 6/2020 | Okajima | G01N 21/8806 |
| 2020/0298361 A1* | 9/2020 | Mutobe | B23Q 17/10 |
| 2021/0180932 A1* | 6/2021 | Itakura | G01B 5/008 |

FOREIGN PATENT DOCUMENTS

| | | |
|---|---|---|
| JP | H04-324301 A | 11/1992 |
| JP | H07-034352 U | 6/1995 |
| JP | 2004-082232 A | 3/2004 |
| JP | 2013029350 A | 2/2013 |
| JP | 2013210202 A | 10/2013 |

* cited by examiner

AUTOMATIC THREE-DIMENSIONAL MEASUREMENT-BASED INSPECTION SYSTEM FOR WORKPIECES

This application is based on and claims the benefit of priority from Japanese Patent Application No. 2019-007142, filed on 18 Jan. 2019, the content of which is incorporated herein by reference.

BACKGROUND OF THE INVENTION

Field of the Invention

The present disclosure relates to an automatic three-dimensional (3D) measurement-based inspection system for workpieces.

Related Art

According to the known art, workpieces machined by a machine tool are subjected to a deburring operation and a cleaning operation, and then undergo various inspections such as an appearance inspection, a screw inspection, and a 3D measurement-based inspection (for example, Patent Documents 1 to 3). Defective workpieces are eliminated through these inspections, thereby making it possible to ship workpieces with high reliability as products.

Patent Document 1: Japanese Unexamined Patent Application, Publication No. S58-97614
Patent Document 2: Japanese Unexamined Patent Application, Publication No. 2013-29350
Patent Document 3: Japanese Unexamined Patent Application, Publication No. 2013-210202

SUMMARY OF THE INVENTION

Meanwhile, in a case where workpieces are subjected to various inspections, in particular, a 3D measurement-based inspection, the 3D measurement-based inspection is preceded by a deburring operation, a cleaning operation, an appearance inspection, and a screw inspection. Therefore, the workpieces are conveyed, together with pallets, from an inspection area where the appearance inspection, the screw inspection, and other inspections are performed to a 3D measurement-based inspection area where a 3D measurement apparatus is installed, by means of a forklift or the like. Each of the workpieces to be inspected is individually transferred to a work table of the 3D measurement apparatus, and then undergoes the 3D measurement-based inspection.

For this reason, the 3D measurement-based inspection involves a lot of process steps such as the conveyance operation and requires a long time. Thus, there has been a strong demand for a technique that enables the 3D measurement-based inspection to be performed more efficiently.

In view of the above circumstances, it is therefore an object of the present disclosure to provide an automatic 3D measurement-based inspection system for workpieces, the inspection system being capable of performing a 3D measurement-based inspection more efficiently.

The present inventors have found a means for enabling such 3D measurement-based inspection to be performed more efficiently, and achieved the present disclosure.

A first aspect of the present disclosure is directed to an automatic three-dimensional measurement-based inspection system for workpieces (e.g., an automatic three-dimensional measurement-based inspection system A for workpieces to be described later), the inspection system including: an automated warehouse (e.g., an automated warehouse 5 to be described later) that stores a workpiece to be inspected (e.g., a workpiece W to be described later); and a three-dimensional measurement apparatus (e.g., a three-dimensional measurement apparatus 1 to be described later) provided in a three-dimensional measurement region (e.g., a three-dimensional measurement region R to be described later) that is adjacent to the automated warehouse.

A second aspect of the present disclosure is an embodiment of the first aspect. In the second aspect, at least the three-dimensional measurement region or both the automated warehouse and the three-dimensional measurement region may be in an isothermal environment.

A third aspect of the present disclosure is an embodiment of the first or second aspect. The inspection system of the third aspect may further include: an inspection jig stocker (e.g., an inspection jig stocker 17 to be described later); and a three-dimensional measurement robot (e.g., a three-dimensional measurement robot 10 to be described later), wherein the inspection jig stocker (e.g., an inspection jig stocker 17 to be described later) may be stored in the automated warehouse, the inspection jig stocker accommodating therein a plurality of inspection jig components (e.g., a positioning plunger 14a, a base part 14b, and a support part 14c to be described later) or an inspection jig (e.g., an inspection jig 14 to be described later) composed of the inspection jig components assembled thereinto, the inspection jig components and the inspection jig being configured to be arranged in conformity with a shape of the workpiece and to support the workpiece when the workpiece is inspected by the three-dimensional measurement apparatus, and the three-dimensional measurement robot (e.g., a three-dimensional measurement robot 10 to be described later) may be configured to select the inspection jig components or the inspection jig from the inspection jig stocker, and to automatically set the selected inspection jig components or inspection jig to the three-dimensional measurement apparatus.

A fourth aspect of the present disclosure is an embodiment of the third aspect. In the fourth aspect, the three-dimensional measurement robot may be configured to automatically arrange the plurality of inspection jig components in conformity with the shape of the workpiece so as to assemble the plurality of inspection jig components into the inspection jig that supports the workpiece.

A fifth aspect of the present disclosure is an embodiment of the third or fourth aspect. In the fifth aspect, the three-dimensional measurement robot may be configured to automatically select and mount a jig setting device (e.g., a jig setting device 15 to be described later) for use in setting the inspection jig components or the inspection jig to the three-dimensional measurement apparatus or a workpiece gripping device (e.g., a workpiece gripping device 16 to be described later) for use in gripping the workpiece, and may be configured to automatically perform a setting operation to set the inspection jig and a conveyance operation to convey the workpiece between the automated warehouse and the three-dimensional measurement apparatus.

A sixth aspect of the present disclosure is an embodiment of any one of the third to fifth aspects. In the sixth aspect, the inspection system may further include: a robot control device that controls driving of the three-dimensional measurement robot, and a system control device (e.g., a system control device 18 to be described later) that performs higher-level system control than the robot control device, the higher-level system control being implemented on at least the three-dimensional measurement robot and the three-dimensional measurement apparatus.

According to the present disclosure, the three-dimensional measurement apparatus is provided in the three-dimensional measurement region that is adjacent to the automated warehouse. This feature allows the three-dimensional measurement apparatus to automatically perform three-dimensional measurement-based inspection of one workpiece while another workpiece is conveyed between the automated warehouse and the three-dimensional measurement apparatus.

Thus, the present disclosure makes it possible to perform automatic three-dimensional measurement-based inspection of workpieces of various types without humans in attendance.

DETAILED DESCRIPTION OF THE INVENTION

An automatic three-dimensional (3D) measurement-based inspection system for workpieces according to one embodiment of the present disclosure will be described below with reference to FIGS. 1 to 4.

Here, the present embodiment relates to an automatic 3D measurement-based inspection system that is configured to inspect, through 3D measurement, a workpiece machined by a machine tool to determine whether the workpiece has a predetermined shape.

Specifically, workpieces to undergo the 3D measurement-based inspection in the automatic 3D measurement-based inspection system are, for example, placed on a pallet and conveyed by an automated guided vehicle (AGV) after having been machined by a machine tool.

Figure 1:
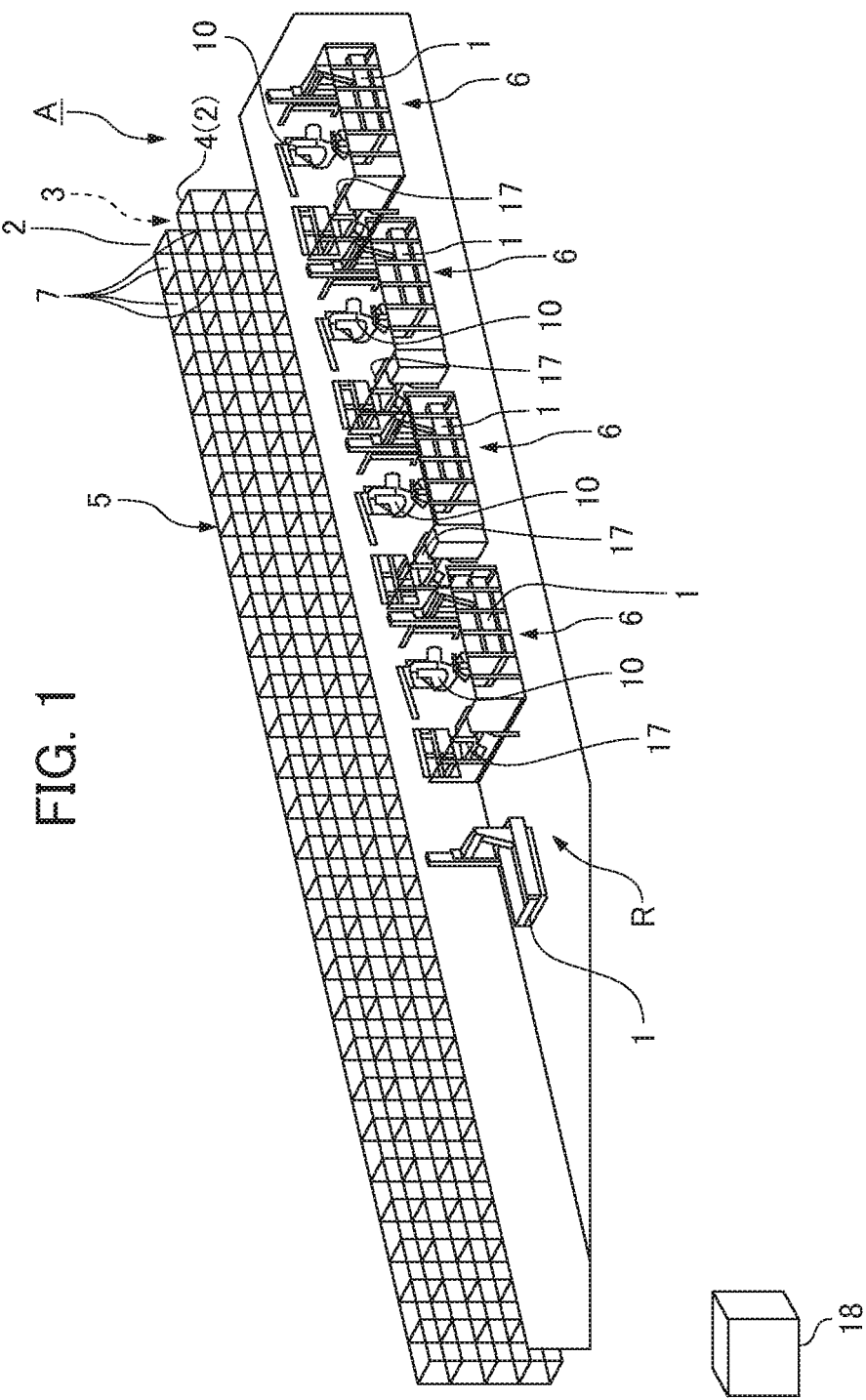
FIG. 1 is a perspective view showing an automatic three-dimensional (3D) measurement-based inspection system for workpieces according to one embodiment of the present disclosure.

As shown in FIG. 1, the automatic 3D measurement-based inspection system A for workpieces according to the present embodiment includes: an automated warehouse 5 having a measurement target repository 2 for storing workplaces W to undergo the measurement-based inspection performed by 3D measurement apparatuses 1, and having a measurement-purpose repository 4 for storing the workpieces W conveyed from the measurement target repository 2 by a stacker crane 3 when the 3D measurement apparatuses 1 are going to perform the measurement; and 3D measurement installations 6 provided in a 3D measurement region R that is adjacent to the automated warehouse 5 (the measurement-purpose repository 4 in the present embodiment).

In the automated warehouse 5, the measurement target repository 2 and the measurement-purpose repository 4 each include a plurality of stacker racks (shelves) 7 that are arranged in a plurality of tiers in a vertical direction and a plurality of rows in a widthwise direction. The measurement target repository 2 and the measurement-purpose repository 4 are arranged parallel to, and spaced apart from, each other in a depth direction. The stacker crane 3 is installed between the measurement target repository 2 and the measurement-purpose repository 4. The stacker crane 3 automatically conveys articles such as the workpieces W to load and unload the articles into and from the stacker racks 7 of the measurement target repository 2 and the stacker racks 7 of the measurement-purpose repository 4. The automated warehouse 5 does not necessarily have to be limited to the configuration of the present embodiment. Any known configuration for the automated warehouse 5 is applicable to the present disclosure.

In the present embodiment, the automated warehouse 5 and the 3D measurement region R are in an isothermal environment in which air conditioning is performed to maintain an air temperature at about 20° C., for example. The 3D measurement region R is divided into a plurality or subareas, and the 3D measurement installation 6 is provided in each of the subareas. Thus, the plurality of 3D measurement installations 6 are provided adjacent to the measurement-purpose repository 4 such that the plurality of 3D measurement installations 6 are arranged next to each other in the widthwise direction of the measurement-purpose repository 4.

Figure 2:
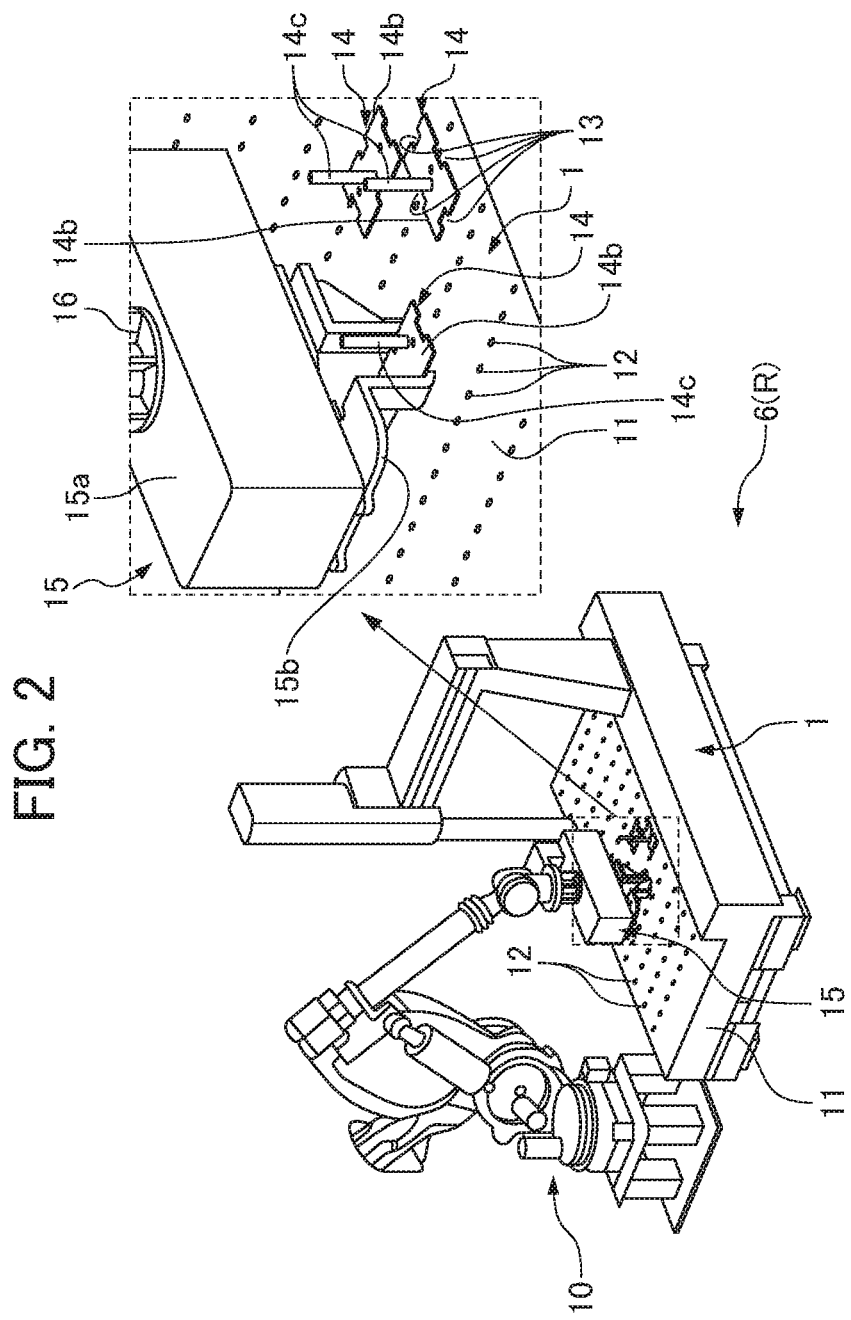
FIG. 2 is a perspective view showing a 3D measurement installation of an automatic 3D measurement-based inspection system for workpieces according to one embodiment of the present disclosure.

As shown in FIGS. 1 and 2, each 3D measurement installation 6 includes the 3D measurement apparatus 1 and a 3D measurement robot 10.

The 3D measurement apparatus 1 is capable of performing various measurements by capturing the shape of the workpiece W in data in a three-dimensional manner, and includes, for example, guide parts orthogonal to each other, and a scale and a probe for determining a travel of each guide part. The 3D measurement apparatus 1 can determine a three-dimensional coordinate value of the probe from the respective travels that depend on the shape of the workpiece W, thereby enabling measurement of dimensions and tolerance of the workpiece W. In the present embodiment, FIGS. 1 and 2 show the 3D measurement apparatuses 1 of a gate type. However, the present disclosure is not limited thereto. As a matter of course, 3D measurement apparatuses of other types such as an articulated arm type may be app fed to the present disclosure.

Figure 3:
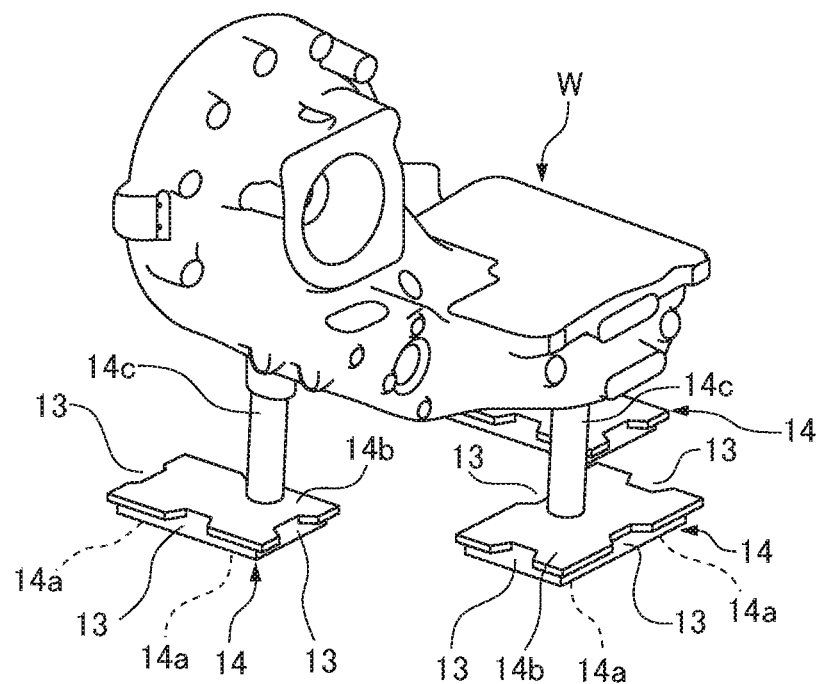
FIG. 3 is a perspective view showing a workpiece and inspection jigs supporting the workpiece.
Figure 4:
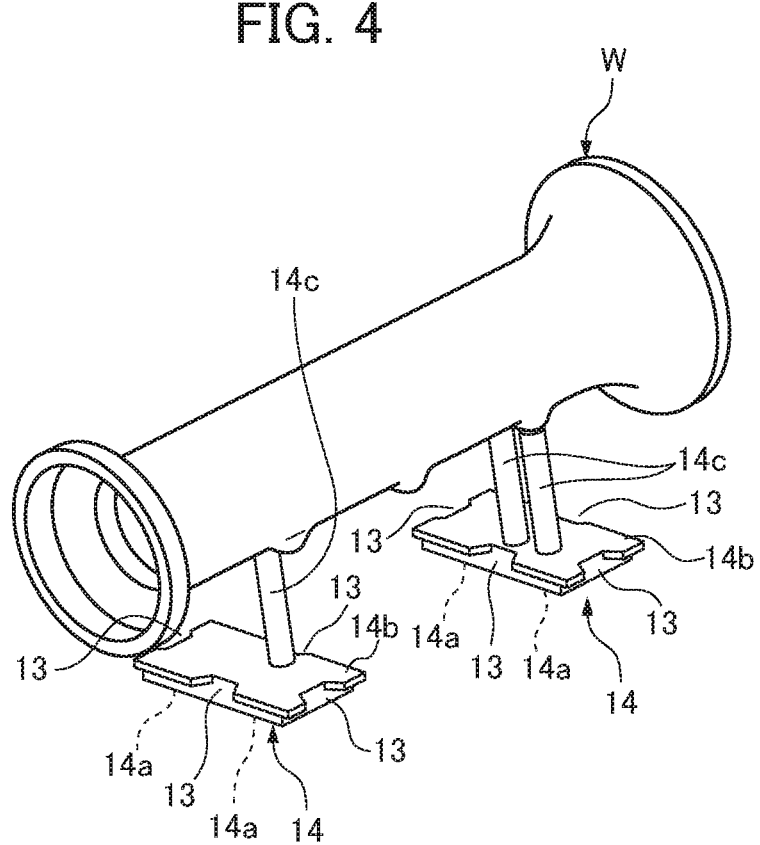
FIG. 4 is a perspective view showing a workpiece and inspection jigs supporting the workpiece.

Further, the 3D measurement apparatus 1 of the present embodiment includes a setting base 11 on which the workpiece W is set. The setting base 11 has a large number of jig insertion holes 12 formed therein. The 3D measurement apparatus 1 is configured such that at least one inspection jig 14 is set via positioning plungers 14a fitted into the jig insertion holes 12. For example, as shown in FIGS. 2, 3, and 4, the 3D measurement apparatus 1 is configured such that the workpiece W is placed and supported on two or more inspection jigs 14 set in conformity with the shape of the workpiece W. While maintaining the workpiece W in this state, the 3D measurement apparatus 1 performs 3D measurement of the workpiece W.

The inspection jig 14 is configured as a module and includes, as its components (inspection jig components 14a, 14b, and 14c): a substantially flat base part 14b having an interface 13 for allowing the 3D measurement robot 10 to grip and connect the inspection jig components (14a, 14b, and 14c) the plurality of positioning plungers 14a protruding downward from the lower surface of the base part 14b, and a support part 14c detachably attached to the upper surface of the base part 14b so as to protrude upward.

Specifically, the inspection jig 14 is prepared by mounting an arbitrary number of support parts 14c to arbitrary positions on the upper surface of the base part 14b in advance in accordance with the shape of the workpiece W, the position at which the workpiece W is set on the setting base 11 of the 3D measurement apparatus 1, and the like. Thus, the components 14a, 14b, and 14c are assembled into the inspection jig 14. The positioning plungers 14a are inserted into the jig insertion holes 12 and the base part 14b is positioned and placed in a predetermined position on the setting base 11. For example, two or more inspection jigs 14 are set such that the upper ends of the support parts 14c of the inspection jigs 14 are in contact with the workplace W, thereby enabling the workpiece W to be held in a stationary manner.

In the present embodiment, the plurality of inspection jig 14 as described above are accommodated in an inspection jig stocker 17. The inspection jig stocker 17 is stored in the automated warehouse 5, and is automatically conveyed to, and disposed in the 3D measurement region R (e.g., in front of the 3D measurement apparatus 1) at the time of jig replacement.

As shown in FIGS. 1 and 2, the 3D measurement robot 10 includes an articulated arm, and is capable of freely moving its distal end portion within a predetermined range in all directions. FIG. 2 shows a state in which the inspection jig 14 is being set to the setting base 11 of the 3D measurement apparatus 1 (or a state in which the inspection jigs 14 on the setting base 11 are about to be replaced).

The 3D measurement robot 10 is configured to automatically select a jig setting device 15 for use in setting the inspection jigs 14 or a workpiece gripping device for use in gripping the workpiece W, and to mount the selected device to the distal end port on of the 3D measurement robot 10. The 3D measurement robot 10 is further configured to automatically carry out a conveyance operation to convey the inspection jigs 14 composed of the inspection jig components (14a, 14b, and 14c) that have been assembled in advance or to convey the workpiece W between the measurement-purpose repository 4 and the 3D measurement apparatus 1, and an inspection operation in which inspection is performed by the 3D measurement apparatus 1. Changing, for example, the arrangement and the number of the inspection jigs 14 with respect to the setting base 11 of the 3D measurement apparatus 1 and/or changing the combination of the inspection jigs 14 make it possible to cope with various types of workpieces W.

It is conceivable, for example, to use the 3D measurement robot 10 to assemble the inspection jig components (14a, 14b, and 14c) such that the inspection jig 14 is automatically assembled in conformity with the shape of the workpiece W. As shown in FIG. 2, the jig setting device 15 is composed of, for example, a servo hand body (drive unit) 15a and an interchangeable finger (inspection jig gripping part) 15b.

The automatic 3D measurement-based inspection system A for workpieces of the present embodiment further includes: a robot control device (not shown) that controls the driving of the 3D measurement robots 10; and a system control device 18 that performs higher-level system control than the robot control device, the higher-level system control being implemented on at least the 3D measurement robots 10 and the 3D measurement apparatuses 1. Thus, the conveyance operation to convey the workpieces W in the automated warehouse 5, the driving of the 3D measurement robots 10, and the actuation of the 3D measurement apparatuses 1 are correlated with one another and are controlled automatically.

Specifically, the stacker crane 3 of the automated warehouse 5 is driven and controlled appropriately to convey and store the workpieces W to be inspected (and/or the inspection jig stockers 17) in predetermined stacker racks 7 of the measurement-purpose repository 4.

As shown in FIGS. 1 to 4, the 3D measurement robot 10 is driven and controlled appropriately to set the inspection jigs 14 to the setting base 11 of the 3D measurement apparatus 1 such that the inspection jigs 14 match the workpiece W to be inspected. Further, when driven and controlled appropriately, the 3D measurement robot 10 conveys the workpiece W from a predetermined stacker rack 7 of the measurement-purpose repository 4, and sets it to the setting base 11 of the 3D measurement apparatus 1 so that the workpiece W is supported on the plurality of inspection jigs 14.

When actuated and controlled appropriately, the 3D measurement apparatus 1 detects the workpiece W set to the setting base 11 of the 3D measurement apparatus 1, and automatically performs 3D measurement of the workpiece W.

When the 3D measurement is completed, the inspected workpiece W is returned to a predetermined stacker rack 7 of the automated warehouse 5 by the 3D measurement robot 10 and the automated warehouse 5 that are driven and controlled appropriately.

In a case where workpieces of the same standard are continuously inspected, subsequent workpieces W are inspected in the same manner as described above. Specifically, the subsequent workpieces W are each set so as to be supported on the inspection jigs 14 on the setting base 11 of the 3D measurement apparatus 1, and the 3D measurement apparatus 1 automatically performs 3D measurement of the subsequent workpiece W.

On the other hand, in a case where workpieces W of different standards are inspected, the inspection jigs 14 (the inspection jig components 14a, 14b, and 14c) is appropriately disassembled and returned to the inspection jig stocker 17. Assembly of the inspection jig 14 in accordance with a workpiece W to be inspected next, setting of the assembled inspection jig 14 to the setting base 11 of the 3D measurement apparatus 1, setting of the workpiece W, and the 3D measurement are performed in sequence.

Thus, in the automatic 3D measurement-based inspection system A for workpieces according to the present embodiment, the automated warehouse 5 has the measurement target repository 2 storing the various workpieces hi and the measurement-purpose repository 4 storing the workpieces W that have been conveyed by the stacker crane 3 from the measurement target repository 2 when the workpieces W are inspected by the 3D measurement apparatuses 1, and the 3D measurement apparatuses 1 are provided in the 3D measurement region R that is adjacent to the automated warehouse 5. This feature allows automatic conveyance of the workpieces W from the measurement target repository 2 to the measurement-purpose repository 4 while the automated warehouse 5 and the 3D measurement apparatuses 1 are in an isothermal environment. The feature further allows each 3D measurement apparatus 1 to automatically perform 3D measurement-based inspection of one workpiece W while another workplace W is conveyed between the automated warehouse 5 and the 3D measurement apparatus 1.

Therefore, the automatic 3D measurement-based inspection system A for workpieces of the present embodiment makes it possible to perform the automatic 3D measurement-based inspection of workpieces W of various types without humans in attendance.

Further, the 3D measurement robot 10 automatically selects and takes out the inspection jig 14 from the inspection jig stocker 17 and sets it at a predetermined position on the setting base 11, thereby enabling the automatic 3D measurement of the workplaces W to be performed more efficiently and effectively.

In the foregoing, one embodiment of the automatic 3D measurement-based inspection system for workpieces according to the present disclosure has been described. However, the present disclosure is not limited to the above-described embodiment, and can be modified as appropriate without departing from the spirit thereof.

EXPLANATION OF REFERENCE NUMERALS

1: Three-Dimensional (3D) Measurement Apparatus
2: Measurement Target Repository
3: Stacker Crane
4: Measurement-Purpose Repository
5: Automated Warehouse
6: Three-Dimensional (3D) Measurement Installation
7: Stacker Rack
10: Three-Dimensional (3D) Measurement Robot
11: Setting Base
12: Jig insertion Hole
13: Interface
14: Inspection Jig
14a: Positioning Plunger (Inspection Jig Component)
14b: Base Part (Inspection Jig Component)
14c: Support Part. (Inspection Jig Component)
15: Jig Setting Device
17: Inspection Jig Stocker
18: System. Control Device
A: Automatic. Three-Dimensional (3D) Measurement-Based Inspection System
R: Three-Dimensional (3D) Measurement Region
W: Workpiece

What is claimed is:

1. An automatic three-dimensional measurement-based inspection system for workpieces, the inspection system comprising:
    an automated warehouse that stores a workpiece to be inspected; and
    a three-dimensional measurement apparatus provided is a three-dimensional measurement region that is adjacent to the automated warehouse.

2. The inspection system according to claim 1, wherein at least the three-dimensional measurement region or both the automated warehouse and the three-dimensional measurement region is or are in as isothermal environment.

3. The inspection system according to claim 1, further comprising:
    an inspection jig stocker; and a three-dimensional measurement robot, wherein
    the inspection jig stocker is stored in the automated warehouse, the inspection jig stocker accommodating therein a plurality of inspection jig components or an inspection jig composed of the inspection jig components assembled thereinto, the inspection jig components and the inspection jig being configured to be arranged in conformity with a shape of the workpiece and to support the workpiece when the workpiece is inspected by the three-dimensional measurement apparatus, and
    the three-dimensional measurement robot is configured to select the inspection jig components or the inspection jig from the inspection jig stocker, and to automatically set the selected inspection jig components or inspection jig to the three-dimensional measurement apparatus.

4. The inspection system according to claim 3, wherein the three-dimensional measurement robot is configured to automatically arrange the plurality of inspection jig components in conformity with the shape of the workpiece so as to assemble the inspection jig components into the inspection jig that supports the workpiece.

5. The inspection system according to claim 3, wherein the three-dimensional measurement robot is configured to automatically select and mount a jig setting device for use in setting the inspection jig components or the inspection jig to the three-dimensional measurement apparatus or a workpiece gripping device for use in gripping the workpiece, and is configured to automatically perform a setting operation to set the inspection jig and a conveyance operation to convey the workpiece between the automated warehouse and the three-dimensional measurement apparatus.

6. The inspection system according to claim 3, further comprising:
    a robot control device that controls driving of the three-dimensional measurement robot, and
    a system control device that performs higher-level system control than the robot control device, the higher-level system control being implemented on at least the three-dimensional measurement robot and the three-dimensional measurement apparatus.

* * * * *